United States Patent [19]
Dils et al.

[11] Patent Number: 5,730,544
[45] Date of Patent: Mar. 24, 1998

[54] WOOD JOINING BISCUITS WITH CENTERING FEATURE

[75] Inventors: Jeffrey M. Dils, Easley; Jeanne A. White, Anderson, both of S.C.

[73] Assignee: Ryobi North America, Easley, S.C.

[21] Appl. No.: 692,617

[22] Filed: Aug. 6, 1996

[51] Int. Cl.⁶ ..................................................... F16B 12/00
[52] U.S. Cl. ...................... 403/292; 403/294; 403/408.1; 403/13
[58] Field of Search ........................... 403/292, 294, 403/401, 402, 266, 267, 13, 14, 408.1, 405.1; 411/442, 443, 477, 478, 488; 52/586.1, 586.2, 585.1

[56] References Cited

U.S. PATENT DOCUMENTS

| | | | |
|---|---|---|---|
| 754,215 | 3/1904 | Hayward | 52/586.1 |
| 2,735,146 | 2/1956 | Purviance | 403/294 |
| 3,431,810 | 3/1969 | Black | 411/478 |
| 3,563,582 | 2/1971 | Shroyer et al. | 52/586.1 X |
| 3,674,068 | 7/1972 | Lucci | 403/292 X |
| 3,855,754 | 12/1974 | Scoville et al. | 403/401 |
| 4,373,829 | 2/1983 | Braxell | 403/267 |
| 4,531,564 | 7/1985 | Hanna | 52/585.1 X |
| 5,439,308 | 8/1995 | Beaulieu | 403/292 |
| 5,458,433 | 10/1995 | Stastny | 403/294 X |

FOREIGN PATENT DOCUMENTS

| | | | |
|---|---|---|---|
| 220652 | 3/1959 | Australia | 403/294 |
| 339735 | 8/1959 | Switzerland | 403/292 |
| 9409280 | 4/1994 | WIPO | 403/272 |

OTHER PUBLICATIONS

"The Art of Woodworking Portable Power Tools", Time–Life Books, 1992.

*Primary Examiner*—Harry C. Kim
*Attorney, Agent, or Firm*—Brooks & Kushman P.C.

[57] ABSTRACT

A carpentry biscuit is provided having an elongated planar body formed of wood having opposed faces spaced apart and thickness T. One of the opposed faces is provided with a longitudinal alignment mark oriented along a longitudinal axis and a transverse alignment mark aligned perpendicular to the transverse axis to aid the user in positioning the biscuit in a slot formed in a pair of boards to be joined together.

6 Claims, 1 Drawing Sheet

WOOD JOINING BISCUITS WITH CENTERING FEATURE

TECHNICAL FIELD

This invention relates to carpentry biscuits, and more particularly to a centering feature provided on a carpentry biscuit.

BACKGROUND ART

Carpentry biscuits, in combination with a plate joiner or the like, are utilized by woodworkers to join two mating boards or panels together. Prior art carpentry biscuits are made of many different materials and come in many different sizes. The most common type of biscuit is made of compressed wood, which aids in solidifying the joint by absorbing the adhesive used to hold the biscuit in the joint. The biscuit absorbs the adhesive, which causes the biscuit to swell and fit snugly in the joint. Other types include plastic biscuits, which are used hold a joint together in awkward clamping positions, and metal biscuits, which allow for easy disassembly and reassembly of furniture.

A problem associated with current carpentry biscuits is that they are not provided with any centering indication means to aid in the assembly of the mating boards. Often, slots cut in the mating boards by a plate joiner or the like are not the precise shape or depth of the biscuit to be inserted. This can cause an uneven alignment of the biscuit when inserted into the slot which will not provide an even fit between the boards, weakening the strength of the joint.

One type of device for joining mating panels is disclosed in U.S. Pat. No. 4,373,829 to Braxell. The Braxell patent discloses a device for mating furniture components which provides passages for applying glue to secure the device within the joint. However, the device is not designed to provide sole support for the furniture components. Rather, a fastener must be used in combination with the device to hold the two furniture components together. Also, the device does not provide any means for providing proper alignment within the joint.

An object of the present invention is to provide a carpentry biscuit having indicia formed into the biscuit so that the biscuit can be properly aligned into slots in mating boards or panels.

SUMMARY OF THE INVENTION

Accordingly, a carpentry biscuit of the present invention is provided for use in forming a joint between mating surfaces of adjacent boards or panels having semi-circular slots formed therein by a rotating cutter blade. The biscuit assembly has an elongated planar body which can be formed of a wooden laminate. Two embodiments of the present invention are disclosed.

A first embodiment discloses a carpentry biscuit having an alignment mark or rib formed on the face of the biscuit which is raised relative to the remainder of face. The alignment mark is provided along the longitudinal axis of the face of the biscuit.

A second embodiment of the carpentry biscuit is provided with channels formed on the face of the biscuit which is recessed relative to the remainder of the face. The alignment mark is provided along the longitudinal axis of the carpentry biscuit.

In both the first and second embodiments of the invention, alignment marks can be provided either along the longitudinal axis, the transverse axis, or the transverse and longitudinal axes. Alignment marks can also be provided on both faces of the carpentry biscuit.

BEST MODE FOR CARRYING OUT THE INVENTION

Figure 1:
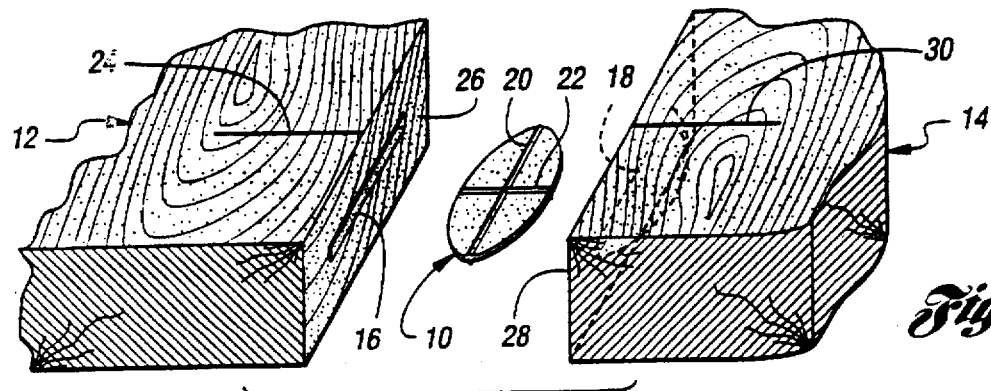
FIG. 1 is a perspective view showing two mating boards provided with semi-circular slots adapted to receive the carpentry biscuit of the present invention.

Now referring to FIG. 1, a carpentry biscuit 10 is provided for joining a first mating board 12, and a second mating board 14. Semi-circular first and second slots 16, 18 are provided in each of the mating boards 12, 14, respectively. Slots 16, 18 are formed into mating boards 12, 14 by a plate joiner, not shown. Carpentry biscuit 10 is inserted into the first slot 16 of mating board 12 until longitudinal alignment mark 20 contacts first mating board 12. Transverse alignment mark 22 is used to center biscuit 10 with the center of slot 16 by aligning mark 22 with center mark 24 provided on board 12. End face 26 of first mating board 12 is brought into contact with end face 28 of first mating board 14. Centering mark 30 on second mating board 14 is aligned with transverse alignment mark 22 of biscuit 10 to bring slot 18 into contact with the biscuit.

Figure 2:
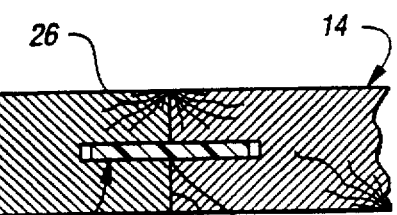
FIG. 2 is a cross-sectional side elevational view of the two mating boards joined together by the carpentry biscuit.

As is best shown in FIG. 2, end faces 26 and 28 of mating boards 12 and 14 are brought into alignment by biscuit 10. End faces 26 and 28 are aligned with the longitudinal alignment mark 20 to provide a level joint between the boards.

Figure 3:
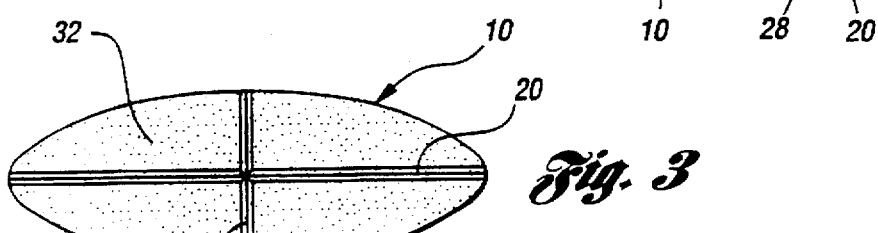
FIG. 3 is a top view of the carpentry biscuit having a raised rib formed on the longitudinal and transverse axes of the face.
Figure 4:
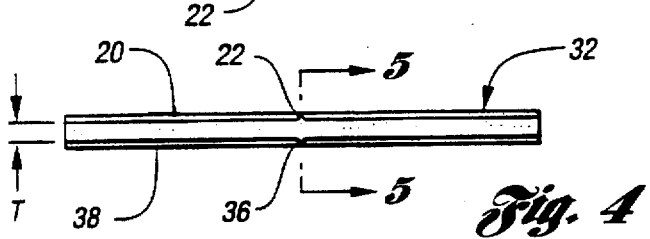
FIG. 4 is a side elevational view of the carpentry biscuit shown in FIG. 3.
Figure 5:
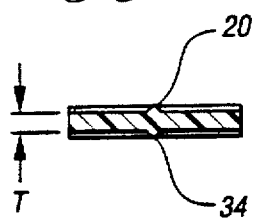
FIG. 5 is a cross-sectional side elevational view along lines 5—5 of the carpentry biscuit shown in FIGS. 3 and 4.

In the preferred embodiment of the invention illustrated in FIGS. 3–5, longitudinal alignment mark 20 is embossed into the outer periphery of biscuit 10 along longitudinal axis of first face 32 along the transverse axis of biscuit 10. Transverse alignment mark 22 is embossed into face 32 perpendicular to the longitudinal alignment mark 20. As can best be seen in the elevational side view in FIG. 4, the transverse alignment mark 22 is raised in relationship to face 32.

As is shown in FIGS. 4–5, longitudinal alignment mark 34 and transverse alignment mark 36 are formed on second face 38 of carpentry biscuit 10. First face 32 and second face 38 are opposed and are separated by a thickness T.

Preferably, the transverse and longitudinal alignment marks 22, 36, 20 and 34 are embossed ribs raised above the planar surface of the first and second face 32 and 38 by 0.010" to 0.030" which is greater than one-half of the difference between the thickness T of the biscuit and the height of first and second slots 16 and 18. The alignment marks, therefore, provide a slight interference fit between the biscuit and the slot stabilizing the biscuit during the gluing operation. The transverse alignment mark, however, is sufficiently small so that when the boards are clamped together as shown in FIG. 2, the transverse alignment mark and/or the associated region of the board to form allowing face to face clamping of the mating boards 12 and 14. In the embodiment illustrated, the transverse alignment mark and the longitudinal alignment mark are generally triangular in cross-section as illustrated in FIGS. 4 and 5. However, alternative geometries could be utilized. It should also be noted that carpentry biscuit 10 of the first embodiment illustrated in FIGS. 3–5, enables the installer of the biscuit to feel the proper alignment between the biscuit and the board even when the biscuit is covered with glue obscuring the longitudinal alignment mark from view.

Figure 6:
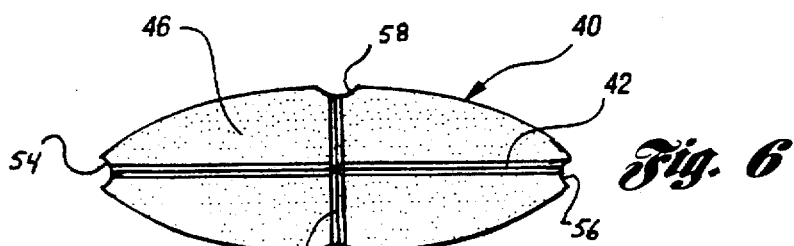
FIG. 6 is a top view of a carpentry biscuit having a recessed rib formed on the longitudinal and transverse axes of the face.
Figure 7:
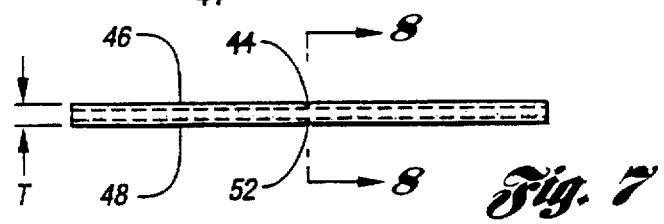
FIG. 7 is a side elevational view of the carpentry biscuit shown in FIG. 6.
Figure 8:
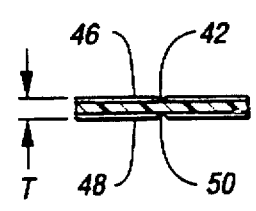
FIG. 8 is a cross-sectional side elevational view of the carpentry biscuit shown in FIGS. 6 and 7 along line 7—7.

A second embodiment of the invention is shown in FIG. 6–8, wherein carpentry biscuit 40 is formed with a recessed longitudinal alignment mark or channel 42 and transverse alignment mark or channel 44 into first face 46. Longitudinal alignment mark 42 and transverse alignment mark 44 sit below first face 46 to provide a centering mark. As is shown in FIGS. 7 and 8, second face 48, separated from first face 46 by a thickness T, can also be provided with a recessed longitudinal alignment mark 50 and transverse alignment mark 52.

A third embodiment of the invention is shown in FIG. 6, wherein carpentry biscuit 40 is formed with notches 54, 56 along the longitudinal axis and notches 58, 60 along the transverse axis. These notches provide additional alignment marks for the user when the biscuit is covered with glue, obscuring the longitudinal and transverse alignment marks from view.

It should also be appreciated that a combination of alignment mark structures disclosed with reference to the first and second embodiments can be utilized For example, a carpentry biscuit could be formed in accordance with the teachings of the present invention having a raised longitudinal alignment mark and a recessed transverse alignment mark, or alternatively, the biscuit could have an alignment mark raised on one planar surface and recessed on the opposite planar surface. Similarly, the carpentry biscuit can be formed of a variety of wooden materials from a pilot type laminate, a single wood strip or a particle board or hardboard like composite, having the appropriate structural integrity and glue absorbing characteristics.

While this invention has been described in detail with particular reference to preferred embodiments thereof, it will be understood that variations and modifications can be effected within the spirit and scope of the invention as described and defined in the appended claims.

What is claimed is:

1. A carpentry biscuit for use in forming a joint between mating surfaces of adjacent wooden boards each having an aligned semi-circular slot formed therein by a rotating cutter blade, the carpentry biscuit comprising:

an elongated planar body formed of wood having opposed faces spaced apart a thickness T; a longitudinal axis and a relatively smaller transverse axis;

a longitudinal alignment mark aligned with the longitudinal axis which is formed into each of the opposed faces of the biscuit;

a transverse alignment mark aligned with the transverse axis which is formed into each of the opposed faces of the biscuit; and a plurality of notches formed along the outer periphery of the biscuit corresponding to the longitudinal and transverse axes to aid a user in positioning the biscuit in the slot formed in at least one of a pair of boards to be joined together.

2. The carpentry biscuit of claim 1 wherein the longitudinal alignment mark is an embossed rib formed in each of the opposed faces of the biscuit which is raised relative to the remainder of the face.

3. The carpentry biscuit of claim 1 wherein the transverse alignment mark is an embossed rib formed in each of the opposed faces of the biscuit which is raised relative to the remainder of the face.

4. The carpentry biscuit of claim 1 wherein the longitudinal alignment mark is an embossed channel formed in each of the opposed faces of the biscuit which is recessed relative to the remainder of the face.

5. The carpentry biscuit of claim 1 wherein the transverse alignment mark is an embossed channel formed in each of the opposed faces of the biscuit which is recessed relative to the remainder of the face.

6. The carpentry biscuit of claim 1 wherein the biscuit is formed of a wood laminate.

* * * * *